(12) United States Patent
Kawabe et al.

(10) Patent No.: US 9,835,109 B2
(45) Date of Patent: Dec. 5, 2017

(54) FUEL INJECTION APPARATUS FOR INTERNAL COMBUSTION ENGINE

(71) Applicant: MITSUBISHI JIDOSHA KOGYO KABUSHIKI KAISHA, Tokyo (JP)

(72) Inventors: Takashi Kawabe, Tokyo (JP); Fumiaki Hiraishi, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 703 days.

(21) Appl. No.: 14/238,315

(22) PCT Filed: Oct. 5, 2012

(86) PCT No.: PCT/JP2012/075930
§ 371 (c)(1),
(2) Date: Feb. 11, 2014

(87) PCT Pub. No.: WO2013/061756
PCT Pub. Date: May 2, 2013

(65) Prior Publication Data
US 2014/0250869 A1  Sep. 11, 2014

(30) Foreign Application Priority Data
Oct. 25, 2011 (JP) .................. 2011-233544

(51) Int. Cl.
| F02D 41/30 | (2006.01) |
| F02D 41/24 | (2006.01) |
| F02D 41/40 | (2006.01) |
| F02M 69/04 | (2006.01) |
| F02D 41/02 | (2006.01) |
| F02D 41/38 | (2006.01) |
| F02D 35/02 | (2006.01) |
| F02D 41/06 | (2006.01) |

(52) U.S. Cl.
CPC .......... *F02D 41/30* (2013.01); *F02D 35/023* (2013.01); *F02D 41/0255* (2013.01);
(Continued)

(58) Field of Classification Search
CPC ....... F02D 2001/0085; F02D 2001/009; F02D 33/003; F02D 33/006; F02D 41/30;
(Continued)

(56) References Cited

U.S. PATENT DOCUMENTS

| 4,765,297 A | 8/1988 | Richter |
| 2002/0043248 A1* | 4/2002 | Kojima ............... F02D 41/3836 123/456 |

(Continued)

FOREIGN PATENT DOCUMENTS

| EP | 1 801 400 A1 | 6/2007 |
| EP | 1 950 403 A1 | 7/2008 |

(Continued)

OTHER PUBLICATIONS

Extended European Search Report dated May 18, 2016 in corresponding European Patent Application No. 12 844 189.6.

*Primary Examiner* — Erick Solis
*Assistant Examiner* — Anthony L Bacon
(74) *Attorney, Agent, or Firm* — Birch, Stewart, Kolasch & Birch, LLP (57) ABSTRACT

Fuel in a fuel tank is supplied by a low-pressure pump to intake passage injectors mounted on an intake manifold via a low-pressure fuel supply pipe and a low-pressure fuel distribution pipe. A high-pressure pump is provided on the low-pressure fuel supply pipe. The pressure of the fuel is boosted by the high-pressure pump, and then is supplied to in-cylinder injectors via a high-pressure fuel distribution pipe. In an intake passage injection (MPI) mode, excitation of a solenoid is stopped and operation of an electromagnetic spill valve is stopped so as reduce vibration and noise caused by the seating of the electromagnetic spill valve in a valve seat.

3 Claims, 3 Drawing Sheets

(52) U.S. Cl.
CPC ..... *F02D 41/2422* (2013.01); *F02D 41/3094* (2013.01); *F02D 41/3845* (2013.01); *F02D 41/401* (2013.01); *F02D 41/406* (2013.01); *F02M 69/046* (2013.01); F02D 41/062 (2013.01); F02D 2041/3881 (2013.01); F02D 2200/021 (2013.01); F02D 2200/0602 (2013.01); F02D 2200/0804 (2013.01); F02D 2200/101 (2013.01); F02M 2200/09 (2013.01); Y02T 10/26 (2013.01); Y02T 10/44 (2013.01)

(58) Field of Classification Search
CPC ............ F02D 41/3011; F02D 41/3017; F02D 41/3082; F02D 41/3094; F02D 41/32; F02D 41/38; F02D 41/3809; F02D 41/3836; F02D 41/3845; F02D 2200/0602; F02D 2250/31; F02M 59/20; F02M 59/34; F02M 59/36; F02M 59/447
See application file for complete search history.

(56) References Cited

U.S. PATENT DOCUMENTS

| | | |
|---|---|---|
| 2005/0193982 A1 | 9/2005 | Sakai et al. |
| 2005/0268889 A1* | 12/2005 | Kojima ................ F02B 23/104 123/458 |
| 2006/0196475 A1* | 9/2006 | Tomoda .............. F02D 41/3094 123/456 |
| 2006/0207563 A1* | 9/2006 | Kinose ................ F02D 41/3094 123/431 |
| 2006/0207568 A1 | 9/2006 | Miyazaki et al. |
| 2006/0254562 A1* | 11/2006 | Akita .................... B60K 6/445 123/431 |
| 2007/0000478 A1 | 1/2007 | Sadakane et al. |
| 2007/0028897 A1* | 2/2007 | Fukasawa ............ F02D 41/042 123/467 |
| 2008/0294323 A1 | 11/2008 | Shinozaki et al. |
| 2009/0177368 A1* | 7/2009 | Fattic .................... F02D 35/023 701/105 |
| 2011/0162620 A1* | 7/2011 | Bidner ................ F02D 41/0025 123/299 |

FOREIGN PATENT DOCUMENTS

| | | |
|---|---|---|
| JP | 8-291729 A | 11/1996 |
| JP | 2005-248757 A | 9/2005 |
| JP | 2006-97660 A | 4/2006 |
| JP | 2006-258039 A | 9/2006 |
| JP | 2007-9815 A | 1/2007 |
| JP | 2010-1815 A | 1/2010 |
| WO | WO 2006/100938 A1 | 9/2006 |

\* cited by examiner

FUEL INJECTION APPARATUS FOR INTERNAL COMBUSTION ENGINE

TECHNICAL FIELD

The present invention relates to an internal combustion engine equipped with an in-cylinder injection injector for injecting fuel into a cylinder at high pressure and an intake passage injection injector for injecting fuel into an intake passage and, in particular, to a control of reducing noise of a high-pressure pump for supplying fuel at high pressure to the in-cylinder injection injector.

BACKGROUND ART

There is a known internal combustion engine which is equipped with in-cylinder injection injectors for directly injecting fuel into cylinders and intake passage injection injectors for injecting fuel into intake passages (including an intake port) and which is configured to select fuel injection from both of the injectors in accordance with the rotation speed and load of the internal combustion engine. The fuel supplied to the intake passage injection injectors is supplied by an electric low-pressure pump provided in a fuel tank. The fuel supplied to the in-cylinder injection injectors is pressurized by a mechanical high-pressure pump mounted on the internal combustion engine and then supplied to the in-cylinder injection injectors.

The mechanical high-pressure pump comprises a plunger that slides within a cylinder by a cam to increase the pressure of the fuel (fuel pressure) in the cylinder, and an electromagnetic spill value that opens and closes a fuel inlet of the cylinder to control a discharge amount to be commensurate with the fuel injection amount of the in-cylinder injectors. This electromagnetic spill valve comprises a spring member for adding a spring force which biases a valve element to an open position, and a solenoid for operating the valve element in a closing direction when being excited.

The electromagnetic spill valve is configured to open the valve element when the solenoid is not excited, and to take in the fuel from a fuel inlet into a pressurizing chamber formed in the cylinder by retracting the plunger. After the solenoid is excited to close the valve element and the pressurizing chamber is closed, the plunger is extended to reduce the volume of the pressurizing chamber, thereby increasing the fuel pressure of the pressurizing chamber. As a result, by pushing a check valve of the discharge port provided in the cylinder, fuel is supplied to the in-cylinder injection injectors. When the valve element is opened, the fuel in the cylinder flows back to the intake side. By adjusting the closing timing of the valve element, it is possible to adjust the fuel pressure (fuel amount) to be supplied to the in-cylinder injection injectors.

When the electromagnetic spill valve is seated on a valve seat, vibration occurs. This vibration is transmitted to a rocker cover from the high-pressure pump and the rocker cover vibrates, thereby generating noise. Conventionally, in the intake passage injection mode for supplying fuel to only the intake passage, the closing timing of the electromagnetic spill valve is delayed to leave the electromagnetic spill valve in the open state when the plunger is extended, so that the fuel is returned to the suction port. As this is only delaying the closing timing of the valve element, the number of closing the valve element is not reduce and thus, the vibration and noise caused by the closing operation is not reduced.

During the idling operation of the internal combustion engine, operating noise of the internal combustion engine is small. Thus, the noise caused by the electromagnetic spill valve is relatively too large to ignore. Therefore, the measure to reduce the noise may be taken by stopping the fuel injection into the in-cylinder injection injectors in the idle operation, and injecting fuel from the intake passage injection injectors. However, there is a problem that, once the fuel injection from in-cylinder injection injectors is stopped, deposits are deposited in-cylinder injection injectors. Therefore, in Patent Reference 1, a fuel injection control means for solving these two problems is disclosed. This means is configured to perform the fuel injection control specific to each operation state of a cold idle state, a warm idle state and a high-temperature idle state that are partitioned according to the temperature of the internal combustion engine, mainly by in-cylinder injection or intake passage injection by the low-pressure pump without using the high-pressure pump.

In Patent Reference 2, a control means having the purpose that is similar to Patent Reference 1 is disclosed. This control means is equipped with a control unit which comprises a noise level estimation means for estimating a noise level in a compartment and a deposit estimation means for estimating whether or not it is in the operation state where deposits tend to accumulate in the in-cylinder injection injectors. When the noise level estimated by this control unit is below a set value, the pressurizing operation by the high-pressure pump is inhibited, whereas when the estimated noise level is not less than the set value and it is estimated that deposits tend to accumulate in the in-cylinder injection injectors, fuel is supplied from the low-pressure pump to the in-cylinder injection injectors without boosting the fuel.

CITATION LIST

Patent Reference

[Patent Reference 1]
  JP 2007-009815 A
[Patent Reference 2]
  JP 2010-001815 A

SUMMARY

Technical Problem

The control means disclosed in Patent Reference 1 and Patent Reference 2, not only need to be equipped with various sensors for detecting various operation state quantities of the internal combustion engine, but also requires a complex control. Thus, there is a problem that this control means is high cost.

In view of the above issues of the related art, it is an object of the present invention, in an internal combustion engine equipped with an in-cylinder injector and an intake passage injector, to reduce noise caused by an electromagnetic spill valve provided in a high-pressure pump without impairing original functions of the electromagnetic spill valve, by means of a simple and inexpensive control means.

Solution to Problem

To achieve the above object, a fuel injection apparatus for an internal combustion engine according to the present invention comprises:

an in-cylinder injector configured to inject fuel into a combustion chamber;

an intake passage injector configured to inject fuel into an intake passage;

a low-pressure pump configured to supply fuel to each of the injectors from a fuel tank;

a high-pressure pump configured to pressurize and supply the fuel supplied from the low-pressure pump and adjust a fuel supply pressure by operation of a spill valve;

a load detection sensor configured to detect a load of the internal combustion engine;

a rotation speed sensor configured to detect a rotation speed of the internal combustion engine;

a fuel pressure sensor configured to detect a pressure of the fuel supplied to the in-cylinder injector; and a control device.

Further, the control device includes:

a storage part configured to store fuel injection map in which an intake passage injection mode for injection from only the intake passage injector, or a combination mode for injection from both the in-cylinder injector and the intake passage injector are set in accordance with the load and the rotation speed of the internal combustion engine, based on the fuel injection map the control device controlling a fuel injection mode of the internal combustion engine; and a spill valve operation control unit which is configured to stop operation of the spill valve when the internal combustion engine is in the intake passage injection mode and the fuel pressure detected by the fuel pressure sensor is not less than a set value.

When the above operating conditions are not satisfied, the spill valve operation control unit performs normal control of the spill valve. The fuel pressure of the fuel supplied to in-cylinder injector is set to the fuel pressure according to the operating condition of the internal combustion engine so as to maintain the responsiveness of the in-cylinder injection.

When the internal combustion engine is in the intake passage injection mode and the pressure of the fuel supplied to the in-cylinder injector is not less than the set value, the closing operation of the spill valve is stopped. Therefore, the number of closing the spill valve is reduced and the vibration and noise caused by the closing operation of the spill valve is also reduced. Further, by keeping the fuel pressure of the fuel supplied to the in-cylinder injector is maintained to at least the set value, it is possible to maintain the function of injecting the fuel to the in-cylinder injector from the high pressure pump at high pressure. Therefore, even when the operation is to be shifted from the intake passage injection mode to the combination mode, it is possible to respond promptly.

Further, the control is performed based on whether or not the engine is in the intake manifold injection mode and whether or not the fuel pressure only is not less than the set value as conditions, and thus the control is very simple. Furthermore, the number of operating state values detected for the engine can be reduced, and this requires few sensors. As the control is simple, the control unit can be simplified and thus, it is possible to realize the control means at low cost.

In the present invention, the load detection sensor may be constituted by a cylinder pressure sensor which is configured to detect a pressure of the combustion chamber in a cylinder, and in the fuel injection map, the intake passage injection mode and the combination mode may be set in accordance with the cylinder pressure and the rotation speed of the internal combustion engine. As a result, the load on the internal combustion engine can be precisely known simply by detecting a net average effective pressure of the cylinder (cylinder pressure).

In the present invention, a hysteresis region of the intake passage injection mode provided near a boundary with the combination mode, an idle region, and a region which does not belong to the hysteresis region or the idle region may have different set values of the fuel pressure based on the load and rotation speed of the internal combustion engine so that the set values are different corresponding to a region. Thus, in accordance with the operation state of the internal combustion engine, the responsiveness of the in-cylinder injection can be maintained. Therefore, even when the operation is to be shifted from the intake passage injection mode to the combination mode, it is possible to respond promptly.

Additionally, the set value of the fuel pressure may become larger in the order of the set value corresponding to the idle region, the set value corresponding to the region not belonging to the hysteresis region or the idle region, and the set value corresponding to the hysteresis region. By setting the set value in this manner, not only it is possible to maintain the responsiveness of the in-cylinder injection, but also it is made easier to stop the spill valve when the possibility of driving the high-pressure pump is low, thereby expanding the opportunity of stopping the spill valve.

In the present invention, a start mode sensor may be provided to detect that the internal combustion engine is in a start mode, and the spill valve operation control unit of the control device may be configured to stop the operation of the spill valve when the internal combustion engine is not in the start mode.

At the beginning of starting the internal combustion engine, the in-cylinder injection is needed in some cases to rapidly increase the temperature in the cylinder, etc. With the above configuration, there is no risk that the operation of the spill valve is stopped by mistake when the internal combustion engine is in the start mode.

In the present invention, the fuel injection apparatus may further comprise:

a cooling water temperature sensor configured to detect a temperature of cooling water for cooling the internal combustion engine; and an exhaust gas purifying catalyst provided in an exhaust passage of the internal combustion engine, and the control device may further include a catalyst activity determination unit which is configured to determine whether or not a temperature of the exhaust gas purifying catalyst reaches an activation temperature based on a detection value of the cooling water temperature sensor, and when the internal combustion engine is in the start mode and the catalyst activity determination unit determines that the temperature of the exhaust gas purifying catalyst does not reach the activation temperature, the control device operates the internal combustion engine in the combination mode until the temperature of the exhaust gas purifying catalyst reaches the activation temperature.

Thus, at the start of the internal combustion engine, even when the exhaust gas purification catalyst is at or below the activation temperature, it is possible to exert the function of the exhaust gas purification catalyst immediately.

Advantageous Effects

According to the present invention, in an internal combustion engine having an in-cylinder injector and an intake passage injector, the operation of the spill valve provided in the high pressure pump is stopped in a period when the in-cylinder injector is not supplied with high-pressure fuel. Thus, it is possible to reduce vibration and noise caused by the seating of the spill valve by means of a simple and inexpensive means. Further, the closing operation of the spill valve is stopped while maintaining the fuel pressure of the high pressure chamber of the high pressure pump at or above the set value. Thus, it is possible to maintain the ability to inject the fuel at high pressure into the in-cylinder injector, and hence to smoothly shift to the combination mode.

DETAILED DESCRIPTION

An embodiment of the present invention will now be described in detail with reference to the accompanying drawings. It is intended, however, that unless particularly specified, dimensions, materials, shapes, relative positions and the like of components described in the embodiment shall be interpreted as illustrative only and not limitative of the scope of the present invention.

Figure 1:
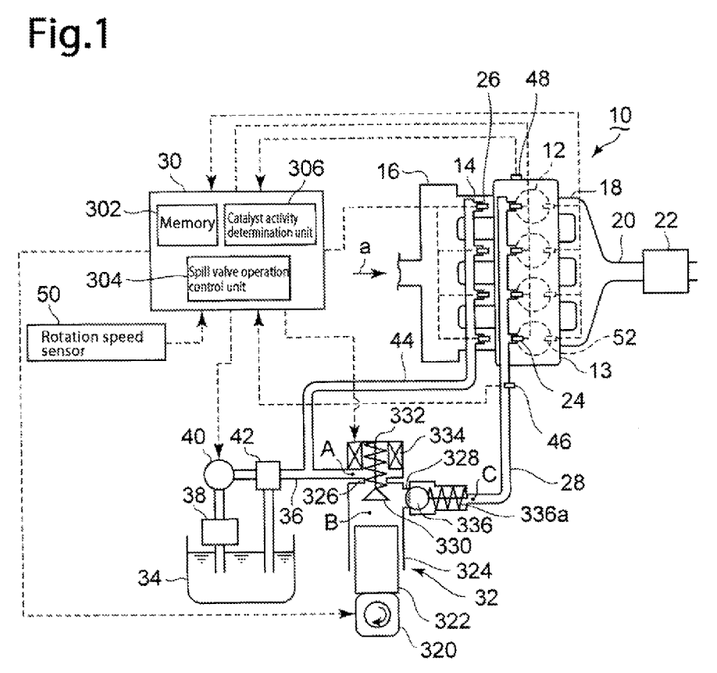
FIG. 1 is an illustration of a general configuration of the apparatus of one embodiment of the present invention.

An embodiment where the present apparatus is applied to a 4 cylinder gasoline engine for a vehicle is described referring to FIG. 1 to FIG. 4. FIG. 1 is an illustration of a general configuration of the apparatus of this embodiment. An engine 10 is equipped with four cylinders 12. The cylinders 12 are connected to a common header 16 via respective intake manifolds 14. An intake air a is taken into the header 16 via an air inlet, an air cleaner, etc. (not shown) and then introduced to the cylinders 12 through respective intake manifolds 14.

An exhaust passage of each of the cylinders 12 is connected to a common exhaust pipe 20 via the corresponding exhaust manifold 18. In the exhaust pipe 20, a three-way catalyst converter 22 is provided to remove harmful substance such as NOx in the exhaust gas.

The cylinders 12 have in-cylinder injectors 24 for injecting fuel to combustion chambers of the cylinders 12, respectively. The intake manifolds 14 have intake passage injectors 26 for injecting fuel into the intake passages, respectively. These injectors 24 and 26 are controlled by signals sent from an engine control unit (ECU) 30 which is configured to control the drive of the overall engine. The ECU 30 comprises a memory 302, a spill valve operation control unit 304 and a catalyst activity determination unit 306.

The in-cylinder injectors 24 are connected to a common high-pressure fuel distribution pipe 28. The high-pressure fuel distribution pipe 28 is connected to a discharge port of the high-pressure pump 32. A suction port of the high-pressure pump 32 is connected to a low-pressure fuel supply pipe 36. In the low-pressure fuel supply pipe 36, a fuel filter 38, a low-pressure pump 40 and a fuel pressure regulator 42 are interposed in this order from a fuel supply upstream side. The intake passage injectors 26 are connected to a common low-pressure fuel distribution pipe 44, and the low-pressure fuel distribution pipe 44 is joined to the low-pressure fuel supply pipe 36 between the high-pressure pump 32 and the fuel pressure regulator 42.

Fuel that is stored in the fuel tank 34 is pumped up by the low-pressure pump 40 and sent to the engine 10. The fuel pumped from the fuel tank 34 passes through the fuel filter 38 to remove contaminants. When the pressure of the fuel discharged from the low-pressure pump 40 is higher than a predetermined set pressure, the fuel pressure regulator 42 serves to maintain the set pressure by returning a part of the fuel to the fuel tank 34.

The high-pressure pump 32 is configured such that, when a pump cam 320 is rotated, a plunger 322 reciprocates within the cylinder 324. An electromagnetic spill valve 330 for opening and closing a flow path between a suction port 326 where the low-pressure fuel supply pipe 36 is connected and a discharge port 328 which is connected to the fuel distribution pipe 28 is provided in the cylinder 12. The spill valve 330 is biased to an open position by a spring force of a coil spring 332, and the spill valve 330 is operated to a position of closing the flow passage through the excitation of a solenoid 334. A check valve 336 is provided in the discharge port 328, and the check valve 336 is biased in the direction of closing the discharge port 328 by a spring force of a coil spring 336a.

In the high-pressure fuel distribution pipe 28, a fuel pressure sensor 46 is provided to generate an output voltage proportional to the fuel pressure of the high-pressure fuel distribution pipe 28. In a cylinder block 13 forming the cylinders 12, a cooling water jacket (not shown) is provided, in which cooling water for cooling the cylinder block 13 is circulated. In the cylinder block 13, a water temperature sensor 48 is also provided to generate an output voltage proportional to the temperature of the cooling water for cooling the cylinder block 13. Further, a rotation speed sensor 50 for detecting the rotation speed of the engine 10 is provided, and the detection value of the rotation speed sensor 50 is sent to the ECU 30. Furthermore, a cylinder pressure sensor 52 is provided to detect a pressure in the combustion chamber of each cylinder 12, and the detection value of the cylinder pressure sensor 52 is also sent to the ECU 30.

In this configuration, the fuel is pumped by the low-pressure pump 40 from the fuel tank 34. The fuel discharged from the low-pressure pump 40 is held at the set pressure by the fuel pressure regulator 42, and part of the fuel is injected from the intake passage injector 26 of each of the intake manifold 14 through the low-pressure fuel supply pipe 36 and the low-pressure fuel distribution pipe 44. On the other hand, the remaining fuel is supplied to the high-pressure pump 32 from the low-pressure fuel supply pipe 36. The fuel which passes through the electromagnetic spill valve 330 from the suction port 326 of the high-pressure pump 32 and enters the cylinder 324, is pressurized as the plunger 322 extends after the electromagnetic spill valve 330 is operated in the closed position. This high-pressure fuel flows into the high-pressure fuel distribution pipe 28 while pushing away the check valve 336 and then is injected into the combustion chamber from the in-cylinder injector 24 provided in each of the cylinders 12.

Figure 2:
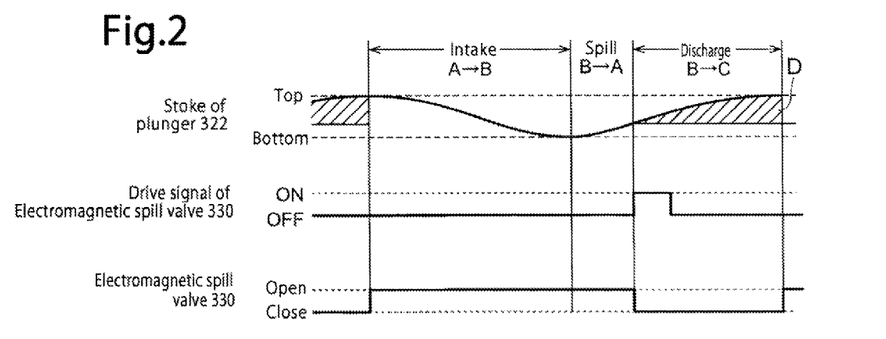
FIG. 2 is a performance chart of operation of a high-pressure pump of the embodiment.

FIG. 2 illustrates the operation of the plunger 322 and the electromagnetic spill valve 330. In the figure, A, B and C respectively refer to A region, B region and C region illustrated in FIG. 1. In other words, A indicates an area of the suction port 326 of the high-pressure pump 32, B indicates an internal area of the cylinder 12 (a high pressure chamber), and C indicates the internal area of the discharge side of the discharge port 328, that is, an interior area of the high-pressure fuel distribution pipe 28. In the figure, the drive signal of the electromagnetic spill valve 330 being turned on indicates that the solenoid 334 is energized, whereas the drive signal solenoid of the electromagnetic spill valve 330 being turned off indicates that the solenoid 334 is de-energized. A shaded area D refers to a section where the high pressure fuel is pressure fed to the high-pressure fuel distribution pipe 28 from the plunger 322. The driving of the pump cam 320 and the low-pressure pump 40, and the excitation time of the solenoid 334 is controlled by the spill valve operation control unit 306 of the ECU 30.

When taking in the fuel inside the cylinder 324 to (B region) from the suction port 326 (A region), the solenoid 334 is de-energized and the electromagnetic spill valve 330 is in the open position. In this state, the plunger 322 is retracted (allowed to fall), and fuel is drawn into the interior of the cylinder 324 from the suction port 326. When the plunger 322 is extended (allowed to rise) in the state where the electromagnetic spill valve 330 is left open, fuel returns to the suction port 326 from the interior of the cylinder 12. Thus, the fuel pressure in the cylinder 324 is determined by the timing of closing the electromagnetic spill valve 330. Depending on this fuel pressure, the amount of fuel returning to the suction port 326, and the amount of fuel pumped to the high-pressure fuel distribution pipe 28 are determined. When discharging the fuel to the high-pressure fuel distribution pipe 28 (C region) from the interior of the cylinder 324 (B region), the solenoid 334 is excited to close the electromagnetic spill valve 330, and then the plunger 322 is extended in the state where the electromagnetic spill valve 330 is closed.

Once the plunger 322 is extended and the fuel becomes high pressure inside the cylinder, even when the excitation of the solenoid 334 is released, the electromagnetic spill valve 330 is kept in the closed position by high pressure inside the cylinder. As the plunger 322 begins to retract from the extended end and the high pressure inside the cylinder is released, the electromagnetic spill valve 330 moves to the open position.

Figure 3:
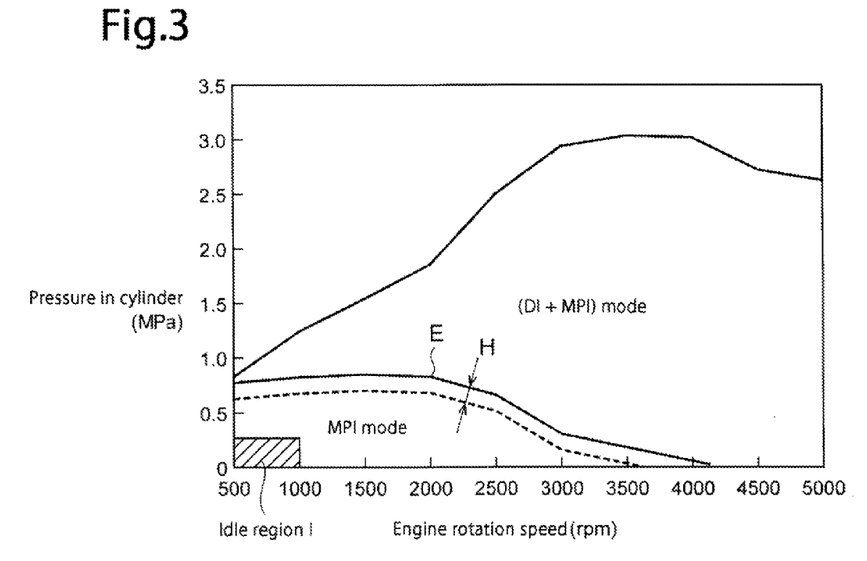
FIG. 3 is a flow chart illustration an operation procedure of the embodiment.

FIG. 3 is a fuel injection map in which an intake passage injection (MPI) mode for performing fuel injection from only the intake passage injector 26, and a combination mode (in-cylinder injection DI+intake passage injection MPI) are defined in accordance with the rotation speed of the engine and the cylinder pressure. This fuel injection map is stored in the memory 302 of the ECU 30 in advance. Based on the fuel injection map, the fuel injection mode of the engine 10 is determined. Further, in the MPI mode, the fuel pressure of the high pressure fuel distribution pipe 28 is set for each operation region. For example, in an idle region I operated in MPI mode, the fuel pressure is set to 7 MPa, and in other region of the MPI mode, fuel pressure is set to 10 MPa.

A hysteresis region H is provided at the boundary between the MPI mode region and the combination (DI+MPI) mode region. The fuel pressure is set to 15 MPa in the hysteresis region H. Thus, the value of the fuel pressure corresponding to the hysteresis region H is set to a value larger than the value of the fuel pressure corresponding to the region that does not belong to either the idle region I or the hysteresis region H, and the value of the fuel pressure corresponding to the region that does not belong to either the idle region I or the hysteresis region H is set to a value larger than the value of the fuel pressure corresponding to the idle region. Incidentally, in the combination mode, the fuel pressure is set to at least 15 MPa and according to the operation state at that time.

Figure 4:
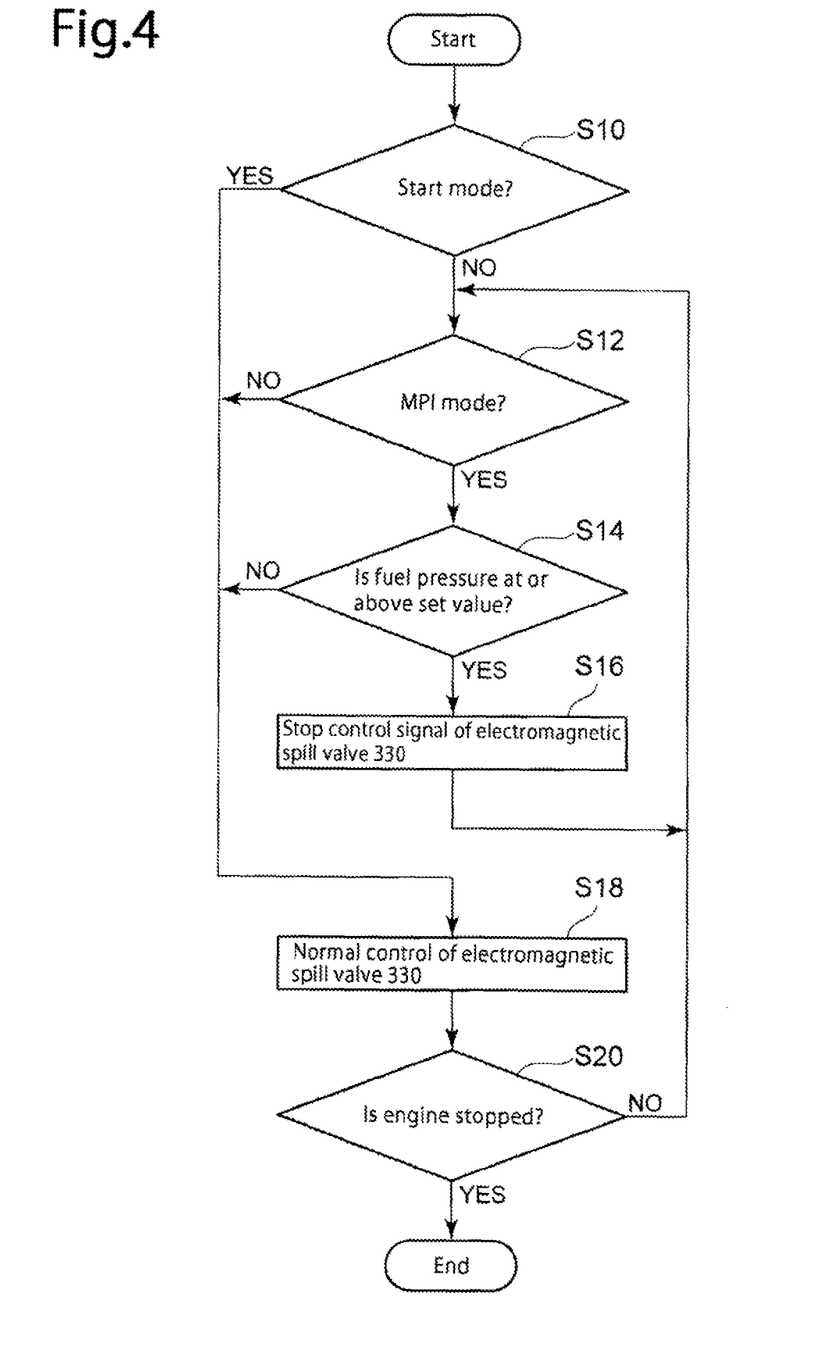
FIG. 4 is a flow chart of a fuel injection map used in the embodiment.

Next, the operation process of this embodiment is described. In FIG. 4, when the operation of the engine 10 is in a start mode (S10), a normal control of the electromagnetic spill valve 330 is performed by the spill valve operation control unit 304 of the ECU 30 (S18). Whether the operation of the engine 10 is in the start mode or not is determined based on the detection value of the rotation speed sensor 50. Specifically, after the start of the engine 10, when the rotation speed≤(0+α), the engine 10 is in the start mode, whereas when the rotation speed exceeds (0+α), the engine 10 is not in the start mode.

When it is determined that the engine 10 is not in the start mode (S10), it is determined whether or not the engine 10 is in the MPI mode (S12). From the detection values of the rotation speed sensor 50 and the cylinder pressure sensor 52, the fuel injection mode the engine 10 is determined among the idle operation mode I, the MPI mode, and the combination mode, on the basis of the fuel injection map illustrated in FIG. 3. When the engine 10 is in the MPI mode (S12), it is determined whether or not the fuel pressure of the high pressure fuel distribution pipe 28 is not less than the set value which is set corresponding to the operation region (S14), based on the input detection value of the fuel pressure sensor 46 from the ECU 30. When the fuel pressure is not less than the set value, the drive signal of the electromagnetic spill valve 330 is turned off by the spill valve operation control unit 304. In other words, the solenoid 334 is de-energized.

As a result, the closing operation of the electromagnetic spill valve 330 is stopped. Therefore, the fuel pressure does not become high in the cylinder 324, and thus the fuel is not supplied to the in-cylinder injector 24. Further, when it is determined in S12 that the engine 10 is not in the MPI mode, or when it is determined in S14 that the fuel pressure of the high-pressure fuel distribution pipe 28 is less than the set value, the normal control of the electromagnetic spill valve 330 is performed by the spill valve operation control unit 304 (S18). Then, until it is determined that the engine 10 is stopped in S20, the process repeats the steps S12 to S18.

Additionally, at the start of the engine 10, the starting operation is made different depending on the detection value of the water temperature sensor 48. Specifically, when the detection value of the water temperature sensor 48 is not less than the set value, for instance 40° C. and above, it is determined in the catalytic activity determination section 306 of the ECU 30 that catalyst equipped in a three-way catalyst converter 22 is heated to the activation temperature. Based on this determination, the engine 10 is started in the MPI mode and then, either the idle operation is performed or the vehicle is started.

When the detection value of the water temperature sensor 48 is less than the set value, for instance below 40° C., it is determined in the catalytic activity determination section 306 of the ECU 30 that the catalyst equipped in the three-way catalyst converter 22 has not reached the activation temperature. Based on this determination, the engine 10 is started in the MPI mode and then switched to the combination mode. By the combination mode operation, the temperature of the exhaust gas of the engine 10 is rapidly increased to rapidly heat the catalyst equipped in the three-way catalyst converter 22 to the activation temperature. When the catalyst is heated to the activation temperature, the engine 10 is switched to the MPI mode and then, either the idle operation is performed or the vehicle is started.

According to this embodiment, during operation in the MPI mode, the spill valve operation control unit 306 of the ECU 30 does not transmit an excitation signal to the solenoid 334 to stop the operation of the electromagnetic spill valve 330. Therefore, vibration of the electromagnetic spill valve 330 that occurs when the electromagnetic spill valve 330 is seated, is eliminated, and thus it is possible to reduce the noise caused by this vibration. Further, by stopping the excitation of the solenoid 334, it is possible to reduce power consumption. Furthermore, the set values of the fuel pressure of the high-pressure fuel distribution pipe 28 are set to different values corresponding to respective fuel injection modes illustrated in FIG. 3. By keeping the fuel pressure to this set value corresponding to each fuel injection mode, it is possible to maintain responsiveness of the in-cylinder injection. Therefore, even when the operation is to be shifted from the intake passage injection mode to the combination mode, it is possible to respond promptly.

Moreover, such control can be achieved by a simple and inexpensive control unit, and the number of operating state values detected for the engine can be suppressed. Thus, for detecting the operating state values, only the fuel pressure sensor 46, the cooling water temperature sensor 48, the speed sensor 50, and the cylinder pressure sensor 52 need to be provided. Since the MPI mode and the combination mode are set in the fuel injection map according to the cylinder pressure and the rotation speed of the internal combustion engine, since the set combination mode and MPI mode according to the rotation speed and cylinder pressure of an internal combustion engine, the load on the engine 10 can be precisely known simply by detecting a net average effective pressure of the cylinder 12 (cylinder pressure).

Further, the set value of the fuel pressure is set to become larger in the order of the idle region I, the region that does not belong to either the idle region I or the hysteresis region H, and the hysteresis region H. Thus, not only it is possible to maintain the responsiveness of the in-cylinder injection, but also it is made easier to stop the electromagnetic spill valve 330 when the possibility of driving the high-pressure pump 32 is low, thereby expanding the opportunity of stopping the electromagnetic spill valve 330.

By providing the rotation speed sensor 50, it is possible to determine whether or not the engine 10 is in the start mode. And based on the determination, the operation of the electromagnetic spill valve 330 is stopped when the engine 10 is not in the start mode. Therefore, there is no risk that the operation of the electromagnetic spill valve 330 is stopped by mistake when the engine 10 is in the start mode.

Further, by providing the cooling water temperature sensor 48 and the catalytic activity determination unit 306, it is possible to determine whether or not the exhaust gas purifying catalyst equipped in the three-way catalyst converter 22 has reached the activation temperature based on the detection values of the cooling water temperature sensor 48. And when the engine 10 is in the start mode and the catalyst activity determination unit 360 determines that the exhaust gas purifying catalyst has not reached the activation temperature, the operation of engine 10 continues till the exhaust gas purification catalyst reaches the activation temperature. Thus, at the start of the engine 10, even when the exhaust gas purification catalyst is at or below the activation temperature, it is possible to exert the function of the exhaust gas purification catalyst immediately.

In this embodiment, determination of the start mode in S10 is performed based on the detection values of the speed sensor 50. Alternatively, a detection value of a vehicle speed sensor may be obtained or an opening/closing state of the throttle valve may be detected so as to determine whether the engine 10 is in the start mode based on these detection values.

INDUSTRIAL APPLICABILITY

According to the present invention, by reducing the closing operation of the spill valve provided in the high-pressure pump for supplying high-pressure fuel into the in-cylinder injector, it is possible to reduce the noise and vibration caused by seating of the spill valve by means of a simple and inexpensive control means.

The invention claimed is:
1. A fuel injection apparatus for an internal combustion engine, the apparatus comprising:
   an in-cylinder injector configured to inject fuel into a combustion chamber;
   an intake passage injector configured to inject fuel into an intake passage;
   a low-pressure pump configured to supply fuel to each of the injectors from a fuel tank;
   a high-pressure pump configured to pressurize and supply the fuel supplied from the low-pressure pump and adjust a fuel supply pressure by operation of a spill valve;
   a load detection sensor configured to detect a load of the internal combustion engine;
   a rotation speed sensor configured to detect a rotation speed of the internal combustion engine;
   a fuel pressure sensor configured to detect a pressure of the fuel supplied to the in-cylinder injector; and
   a control device including:
      a storage part configured to store fuel injection map in which an intake passage injection mode for injection from only the intake passage injector, and a combination mode for injection from both the in-cylinder injector and the intake passage injector are set in accordance with the load and the rotation speed of the internal combustion engine, the control device controlling a fuel injection mode between the intake passage injection mode and the combination mode based on the fuel injection map; and
      a spill valve operation control unit which is configured to: stop operation of the spill valve when the internal combustion engine is in the intake passage injection mode and the fuel pressure detected by the fuel pressure sensor is equal to or greater than a set value; and operate the spill valve when the fuel pressure detected by the fuel pressure sensor is lower than the set value to increase the detected fuel pressure to a set target fuel pressure, and
   wherein the intake passage injection mode includes an idle region where the engine rotation speed and the load are relatively low, and a region other than the idle region where the engine rotation speed and the load are higher than those in the idle region, and
   the set target fuel pressure is set lower in the idle region than the set target pressure in the region other than the idle region,
   wherein the load detection sensor is constituted by a cylinder pressure sensor which is configured to detect a pressure of the combustion chamber in a cylinder, and
   wherein in the fuel injection map, the intake passage injection mode and the combination mode are set in accordance with the cylinder pressure and the rotation speed of the internal combustion engine,
   wherein the intake passage injection mode further includes a hysteresis region provided near a boundary with the combination mode, and each of the idle region, the region other than the idle region, and the hysteresis region has different set target pressure from one another, and wherein the set target pressure in the hysteresis region is higher than the set target pressure in the region other than the idle region.

2. The fuel injection apparatus for the internal combustion engine according to claim 1, further comprising:

a start mode sensor configured to detect that the internal combustion engine is in a start mode, wherein the spill valve operation control unit of the control device is configured to stop the operation of the spill valve when the internal combustion engine is not in the start mode.

3. The fuel injection apparatus for the internal combustion engine according to claim 2, further comprising:

a cooling water temperature sensor configured to detect a temperature of cooling water for cooling the internal combustion engine; and an exhaust gas purifying catalyst provided in an exhaust passage of the internal combustion engine, wherein the control device further comprises a catalyst activity determination unit which is configured to determine whether or not a temperature of the exhaust gas purifying catalyst reaches an activation temperature based on a detection value of the cooling water temperature sensor, wherein, when the internal combustion engine is in the start mode and the catalyst activity determination unit determines that the temperature of the exhaust gas purifying catalyst does not reach the activation temperature, the control device operates the internal combustion engine in the combination mode until the temperature of the exhaust gas purifying catalyst reaches the activation temperature.

* * * * *